April 17, 1928. 1,666,332
E. W. HIRSCH
BLADDER PRESSURE TESTING APPARATUS
Filed May 23, 1927
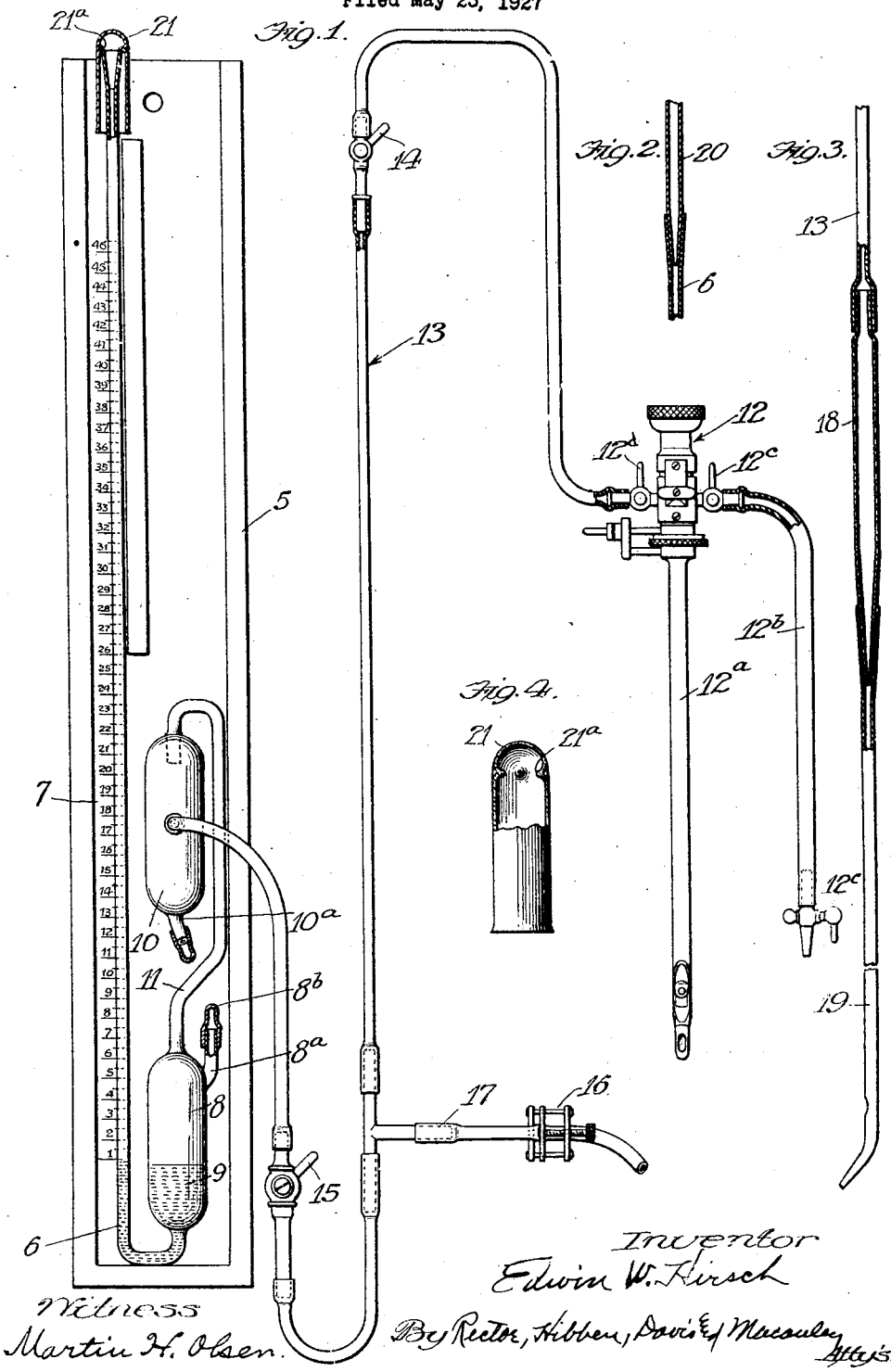
Witness
Martin H. Olsen
Inventor
Edwin W. Hirsch
By Rector, Hibben, Davis & Macauley
Attys.

Patented Apr. 17, 1928.

1,666,332

UNITED STATES PATENT OFFICE.

EDWIN W. HIRSCH, OF CHICAGO, ILLINOIS.

BLADDER-PRESSURE-TESTING APPARATUS.

Application filed May 23, 1927. Serial No. 193,399.

My invention relates to pressure testing apparatus and has to do particularly with means for accurately testing and measuring the pressure of the human bladder.

Testing of the bladder pressure, or the pressure exerted by the urine therein, indicates, among other things, the condition of the bladder muscle. The determination of this pressure and condition enables the diagnostician to determine with a greater degree of certainty the existence of certain diseases and conditions, and thereby he may more accurately prescribe and carry on treatment, for example it may be desirable to measure such pressure in cases of abnormally frequent urination to determine whether the cause is mental or physical. This may also be done in enlarged prostate gland diagnosis and treatment; in determination of whether the case under treatment is hypertonic (increased contraction of bladder muscle) or hypotonic (relaxed condition of the bladder muscle) and the extent of such conditions; in determining the action of certain drugs on the bladder; to ascertain whether an enuresis condition is organic or functional; and other well known instances.

Pressure to be determined in such cases is very delicate and it is essential that it be determined to an exact and fine degree since very slight pressure variations may indicate conditions or diseases and causes, requiring different modes of treatment. Known devices employed for measuring such pressure are objectionable for many reasons, one of which is that mercury is employed as the measuring medium and against which the bladder pressure must act. The difference in the specific gravity of mercury and the urine contained in the bladder is great, and it is with considerable strain and physical effort that the bladder muscle eventually functions to overcome the resistance of the mercury to an extent sufficient to register a pressure with the result that such muscle becomes fatigued making it impossible to determine its true so-called tone. Also, in the use of a mercury gauge to determine this pressure, the pressure indicating movement of the mercury is necessarily so slight, even when subjected to considerable bladder pressure, that such pressure can only be approximated. Delicate measurements can not be made, thus defeating the purpose because, as pointed out, proper treatment may depend on a slight variation which could not be recorded by the mercury gauge. The use of such known and unsatisfactory testing structures may result in injury to the patient and improper diagnosis and treatment.

One of the objects of my invention is to provide means for positively and accurately measuring the bladder pressure, and all variations in the same whether they be slight or great. To this end I provide, in part, a novel system of fluid and pressure chambers and a communication means, including a measuring medium which is of a sensitive character and which readily responds to the reactions of the bladder muscle without danger of fatiguing such muscle, and thereby the true existing bladder conditions can be positively determined in each individual case.

Another object is to provide a measuring apparatus which is simple and compact, and cheap to manufacture, easy to operate, and which may be readily transported from place to place, as from room to room or bed to bed as in a hospital.

Another object is to provide a system which may be readily cleaned and sterilized and which is particularly adapted to prevent urine from entering the measuring apparatus; the provision for simultaneous testing of the bladder pressure and observation of conditions within the bladder; the provision and means for readily carrying out successive bladder decompression tests without removal or substitution of operating parts; the provision for the variation of the measuring tube to take care of maximum pressures; and to protect the measuring fluid at all times from dust, dirt, etc.

Other objects will become apparent as this description progresses and by reference to the drawings:—

Figure 1 is an elevated view of an apparatus embodying my invention as used with a cystoscope.

Figure 2 is a view illustrating means for extending the measuring arm of a U-tube to take care of excessive pressures.

Figure 3 is an elevated view partly in section, showing a catheter attachment.

Figure 4 is an elevated view, partly in section, of a cap for preventing dirt, etc. from entering the apparatus through the measuring tube.

Referring to the drawing, the apparatus may be mounted on a portable support 5 which may be of any desired form. The apparatus includes a transparent U-tube 6 having a long vertical arm open at its end and attached to the support over a finely graduated scale 7, such as a centimeter scale. This U-tube has a short arm extended vertically through and into a transparent bowl 8 adapted to contain distilled water 9 which is, preferably, violet-colored, the water being deposited in this bowl through the nozzle 8$^a$ to an extent sufficient to raise the level of the same in the U-tube to the one-centimeter mark. The nozzle 8$^a$ is normally closed by the rubber cap 8$^b$.

The fluid bowl 8 is connected to the top of another and vertically spaced transparent bowl or chamber 10 by a transparent tube 11 which projects slightly into the latter bowl. This bowl 10 is connected at a central point to a cystoscope 12 by means of a flexible conduit 13 which is, preferably, formed in sections for facilitating sterilization and manipulation. The cystoscope is of well known construction having a bladder insertion tube 12$^a$, discharge tube 12$^b$, controlled by valves 12$^c$, and valve 12$^d$ controlling connection with the tube 13.

In using the apparatus so far described, the cystoscope tube is inserted in the bladder in the usual manner with the valves closed and, when it is desired to measure the pressure, the valves 12$^d$, 14 and 15 are opened, the valve 12$^d$, particularly being opened at a rate and to an extent depending upon the requirements of the case under treatment. It is understood that the clamp 16 in branch tube 17 is closed at this time. As the foregoing takes place the bladder muscle functions to expel the urine from the bladder through the cystoscope into the tube 13. The urine forces the air into the tube 13 ahead of it into the bowl, or pressure chamber 10 and thence into the bowl 8, the tendency being to compress the air therein upon the surface of the fluid 9. This action causes the fluid 9 to rise in the long arm of the U-tube to an extent directly proportionate to the pressure of the bladder fluid. The extent of this rise, or any variation in such rise is accurately indicated by the scale 7.

At this point it may be noted that the specific gravity of the fluid 9 approximates very closely the specific gravity of the urine with the result that such fluid 9 responds promptly and accurately to even slight variations of the urine being expelled, and, consequently, slight variations in the bladder muscle action. This arrangement and readily responsive measuring medium eliminates the possibility of fatiguing the bladder muscles, and enables the diagnostician to determine with a fine degree of accuracy the true tone of such muscles without danger of injury to the patient. The foregoing accuracy in measurement is aided as to positiveness, uniformity and stability by the arrangement of the storage pressure bowl 10 between the bladder and bowl 8. This insures a smoother build-up and uniform maintenance of pressure in the bowl 8 which aids in the accuracy referred to.

Upon the completion of the foregoing pressure measurement, the bladder may be drained by opening the tube 12$^b$ and closing one or all of the valves leading to bowl 10. The bowl 10 is arranged to prevent the deposit of urine in the bowl 8 during the test. It will be noted that the bowl 10 is located above the bowl 8 and the tube 11 is connected to such bowl 10 at its top portion, all of which is clearly shown in Figure 1. In the event that urine enters the bowl 10, it may be drained by removing the rubber cap from the nozzle 10$^a$.

Bladder decompression tests may be made as in the case of a distended bladder. To accomplish that, the valve 15 is closed, the valves 12$^d$ and 14 opened and the clamp 16 released to permit the desired rate of flow of urine from the bladder. This flow may be periodic, each flow period being followed by opening of the valve 15, and the pressure noted as indicated on the scale 7. The foregoing may also be accomplished by obvious manipulation of the valves in the discharge tube 12$^b$ of the cystoscope. Furthermore, at the time the foregoing observations are being made internal conditions of the bladder may be observed through the cystoscope.

A rubber catheter may be used instead of the cystoscope. In that case the end of tube 13 is connected to the transparent joint 18 (Figure 3) to which the catheter 19 is connected. Control of the apparatus is now effected solely through the valves 14 and 15 while further operation is the same as above described.

If the bladder pressure should exceed the capacity of the U-tube 6, the extension tube 20 of Figure 2 may be used by inserting its tapered end in the funnel-shaped end in the long arm of the U-tube which is, preferably reinforced for such insertion.

It will be noted that the U-tube 6 above the fluid 9 is open to atmosphere, and, to prevent dirt, dust, etc. from entering the same I provide the dust cap 21 of Figure 4. This cap is provided with an annular row of internal ribs or corrugations 21$^a$ which contact with the upper rim of the tube 5. This arrangement freely admits air past the cap into the tube between the ribs 21$^a$ while positively excluding dirt, etc. therefrom. This keeps the fluid 9 in its original and pure condition.

Various modifications may be made in the apparatus described without departing from my invention. The bowls 8 and 10 may be made of different shape and formed of non-corroding and non-transparent material with suitable windows therein. Also the tubes and controls may be varied to suit the conditions of use. The graduated scale may be formed directly on the long arm of the U-tube instead of using a separate scale.

While I have referred generally to testing the bladder pressure with the urine normally contained in the bladder, it is to be understood that this pressure may also be tested by injecting varying quantities of water or other irrigating fluid into the bladder and by then manipulating the foregoing apparatus as described to determine the pressure. This may be done in cases where the bladder does not contain a sufficient amount of urine such as may be required for the particular test.

I claim:—

1. Apparatus for testing the pressure of the human bladder comprising means adapted to be projected into the bladder to permit the flow of urine therefrom, a pressure gauge, a measuring fluid in said gauge having a specific gravity approximating the specific gravity of the urine, conduit means between said first named means and said gauge adapted to receive the urine, variable controls carried by said conduit means, and a pressure chamber in said conduit means between said gauge and first named means for stabilizing and uniformly delivering the pressure exerted by the flowing urine to said pressure gauge and for preventing the passage of the urine into said gauge.

2. The combination with means for communication with the human bladder, and for delivering urine therefrom, of bladder pressure testing means comprising a transparent U-tube having a long arm and a short arm, a finely graduated scale associated with said long arm, a fluid chamber connected to said short arm, a fluid in said chamber having a specific gravity approximating that of the urine, a pressure chamber above said fluid chamber, a conduit connected to the top of said fluid chamber and leading to the upper part projecting downwardly into said pressure chamber, and a conduit connected to said pressure chamber and to said bladder communicating means including valves for controlling at will communication between the latter, the arrangement being such that as the urine flows into said second named conduit air therein is forced into said pressure chamber whence it is delivered to said fluid chamber causing the fluid there-in to rise in the long arm of said U-tube to an extent directly corresponding to the pressure exerted thereon.

3. In apparatus for testing the pressure of the human bladder, a portable support, a finely graduated scale mounted thereon, a U-tube having an arm mounted over said scale, a fluid chamber connected to the other arm of said U-tube, a vertically displaced pressure chamber, means adapted to be inserted in the human bladder and to withdraw urine therefrom, and a conduit for connecting said pressure chamber to said means and to receive the urine.

4. In apparatus of the character described, means for communication with the interior of the bladder and to permit flow of urine therefrom, a conduit connected to said means, a pressure chamber connected to said conduit and adapted to initially receive air forced ahead of the urine flowing into said conduit, another chamber for receiving said air from said first chamber, and means for accurately measuring the pressure developed including a fluid in said second named chamber substantially of the specific gravity of the urine and upon which said expelled and compressed air acts.

5. In apparatus for testing the pressure of the human bladder, a device adapted to communicate directly with the bladder and guide the flow of fluid therefrom, a pressure guage including distilled water as the measuring fluid, a conduit connected to said device for receiving the fluid from the bladder, and a pressure chamber interposed between said conduit and said guage for initially receiving the force of the air expelled from said conduit as the said bladder fluid flows thereinto and to prevent said fluid from entering said guage.

6. Apparatus for measuring the pressure of the human bladder comprising means adapted to be inserted into the bladder and to permit the flow of urine therefrom, a pressure guage, a conduit connected to said means and to said pressure gauge, said gauge including distilled water as a measuring medium and to which is subjected the pressure of the air expelled from said conduit as the urine flows thereinto.

7. Apparatus for measuring the pressure of the human bladder comprising means adapted to be inserted into the bladder and to permit the flow of urine therefrom, a pressure gauge, a conduit connected to said means and to said pressure gauge, said gauge including distilled water as a measuring medium and to which is subjected the pressure of the air expelled from said conduit as the urine flows thereinto, and a pressure chamber between said means and said gauge for initially receiving said air under pressure and delivering the same uniformily to said gauge.

8. In apparatus for measuring the pressure of the human bladder, the combination of means adapted to be inserted in the bladder and to withdraw the urine therefrom, a pressure registering device comprising U-tube having a long open-ended arm and a short arm, a finely graduated scale associated with said long arm, a fluid bowl having distilled water therein connected to said short arm; a flexible conduit connected to said means and adapted to receive urine from the bladder, said conduit having variable flow control devices therein; and a pressure bowl interposed between said conduit and fluid bowl to initially receive the air forced from said conduit by the flowing urine and to deliver such air under uniform pressure conditions upon said distilled water in said fluid bowl causing said distilled water to rise in the long arm over said U-tube to an extent directly proportionate to the pressure exerted.

9. In apparatus for testing the pressure of the human bladder, means adapted to be inserted into the bladder for withdrawing the urine therefrom, a conduit connected to said means, a pressure gauge connected to said conduit and including a U-tube having one arm calibrated and open to atmosphere, a fluid chamber connected to the other arm of said U-tube, a fluid in said chamber adapted to rise in the calibrated arm of said tube, said fluid being of a character adapted to respond directly to the pressure, and variations of the pressure, of the urine flowing through said conduit, said calibrated arm being adapted to indicate all such variations.

10. In pressure testing apparatus, a pressure gauge having a tubular calibrated arm with its outer end open to atmosphere, and a cap to be adapted to be placed over the open end of said tube arm, said cap being of such diameter as to fit loosely over said end and having internal corrugations adapted to contact with the top of said tube and permit air to flow past said cap into said tube.

11. In pressure testing apparatus, a pressure gauge having a tubular arm with its free end open to atmosphere, and a dirt-exclusion cap over said free end, said cap having internal ribs in its top which contact with the top of said arm and establish communication of the tube with atmosphere while excluding dirt, dust, etc. therefrom.

12. In pressure testing apparatus, a U-tube having a calibrated open-ended tubular arm, a fluid chamber connected to the other arm of said U-tube, the open end of said tube arm being funnel-shaped, and a tubular extension member having a tapered end portion adapted to engage said funnel-shaped portion to extend the measuring limits of said calibrated arm.

In testimony whereof, I have subscribed my name.

EDWIN W. HIRSCH